United States Patent [19]

Clebowicz

[11] Patent Number: 5,091,940
[45] Date of Patent: Feb. 25, 1992

[54] DATA ROUTER WITH BURST SHUFFLING AND DESHUFFLING OUTPUT BUFFERS

[75] Inventor: Brian A. Clebowicz, Redondo Beach, Calif.

[73] Assignee: Hughes Aircraft Company, Los Angeles, Calif.

[21] Appl. No.: 464,815

[22] Filed: Jan. 16, 1990

[51] Int. Cl.⁵ .................. H04K 1/06; H04L 9/06
[52] U.S. Cl. ........................... 380/37; 380/9; 380/42; 380/50; 375/1
[58] Field of Search ............ 375/1; 380/9, 28, 36, 380/37, 50, 42, 11

[56] References Cited

U.S. PATENT DOCUMENTS

| | | | |
|---|---|---|---|
| 4,087,626 | 5/1978 | Brader | 380/42 |
| 4,636,851 | 1/1987 | Drury et al. | 380/11 |
| 4,750,205 | 6/1988 | Lee et al. | 380/9 |
| 4,907,275 | 3/1990 | Hashimoto | 380/50 |

Primary Examiner—Bernarr E. Gregory
Attorney, Agent, or Firm—Steven M. Mitchell; Robert A. Westerlund; Wanda K. Denson-Low

[57] ABSTRACT

An improved data router 10 with burst deshuffling and shuffling output buffers that performs input data deshuffling and output data formatting and shuffling using only one burst buffer per input channel 16 and one frame buffer per output channel 26. The router 10 includes input channels 16 for receiving input bursts, input burst buffers 14 for storing the input bursts, output frame buffers 23 for storing the input bursts in a deshuffled order and providing formatted and shuffled output bursts, output channels 26 for transmitting the output bursts and a router controller 20 for controlling the operation of the router. Due to the advantageous design of the data router 10 of the present invention, the input bursts and output bursts may be of different sizes and have different transmission data rates.

2 Claims, 4 Drawing Sheets

DATA ROUTER WITH BURST SHUFFLING AND DESHUFFLING OUTPUT BUFFERS

This invention was made with Government support under a contract awarded by the Government. The Government has certain rights in this invention.

BACKGROUND OF THE INVENTION

1. Field of the Invention

The present invention relates to communication systems. More specifically, the present invention relates to data routing systems.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Data routing systems route data from an input channel to an appropriate output channel. Often, data is input and output in bursts, with a number of bursts making up a frame. Certain satellite data routing systems, for example, particularly those built for secure communications, require the ability to time deshuffle the order of incoming data bursts and to time shuffle the order of outgoing data bursts. In addition, output buffers must format the output data to obtain the proper burst rate and burst size.

The conventional approach for data routing systems is to provide one dedicated input frame buffer for each input channel and two dedicated output frame buffers for each output channel, with one output frame buffer for data shuffling and one output frame buffer for data formatting. Thus, in conventional designs, one additional frame buffer is required for each added input channel and two additional frame buffers are required for each added output channel. This becomes prohibitively expensive when frame sizes or the number of input/output channels is large because such additional memory adds significantly to the weight, size and power requirements of a satellite. These mission critical parameters must be limited to minimize the high cost of satellite manufacture and launch.

Thus, there is a need in the art for a data routing system requiring less memory for input data deshuffling and output data formatting and shuffling than current data routing systems. Further, satellite customers often change the number of required input and output channels during the proposal or design periods. Hence, there is an additional need in the art for a data routing system requiring less additional memory for each additional input and output channel than current data routing systems.

SUMMARY OF THE INVENTION

The need in the art is addressed by the improved data router with burst shuffling and deshuffling output buffers of the present invention. The invention provides a data router that performs input data deshuffling and output data formatting and shuffling using only one burst buffer per input channel and one frame buffer per output channel. The router includes input channels for receiving input bursts, input burst buffers for storing the input bursts, output frame buffers for storing the input bursts in a deshuffled order and providing formatted and shuffled output bursts, output channels for transmitting the output bursts and a router controller for controlling the operation of the router. Due to the advantageous design of the data router of the present invention, the input bursts and output bursts may be of different sizes and have different transmission data rates.

DESCRIPTION OF THE INVENTION

Figure 1:
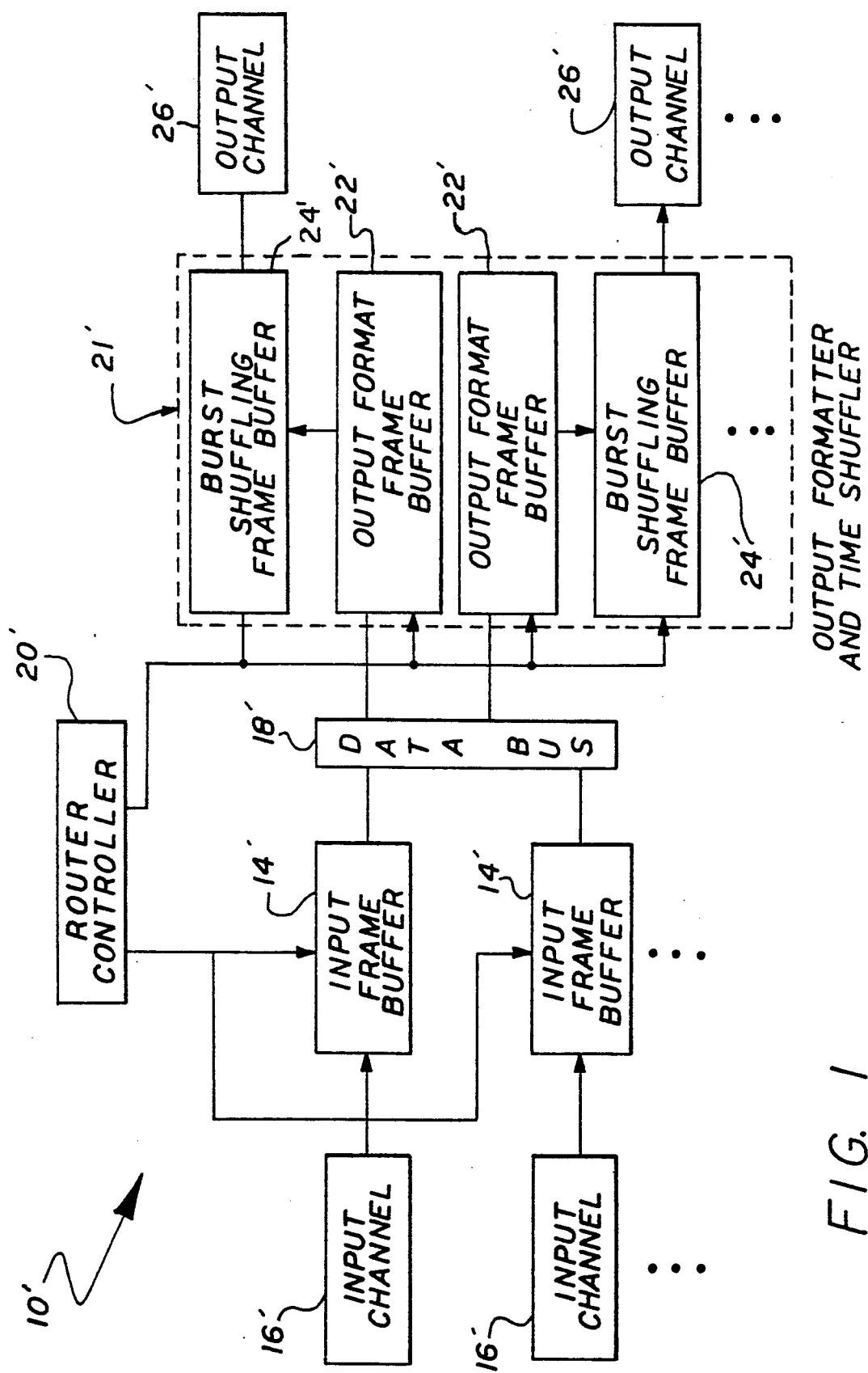
FIG. 1 shows a block diagram of a typical data router constructed in accordance with the teachings of the related art.

Illustrative embodiments and exemplary applications will now be described with reference to the accompanying drawings to disclose the advantageous teachings of the present invention. The present invention is most clearly disclosed by first reviewing the data router design of the related art. FIG. 1 shows a typical data router 10' constructed in accordance with conventional teachings. The router 10' includes one input frame buffer 14' per input channel 16', a data bus 18', a router controller 20' and an output formatter and time shuffler 21'. The output formatter and time shuffler 21' typically contains one output format frame buffer 22' and one burst shuffling frame buffer 24' per output channel 26'. The data router 10' performs input time deshuffling on the input data received by each input channel 16'. The router 10' then routes this data through the data bus 18' to the output formatter and time shuffler 21' for output frame formatting and output burst shuffling before transmission on the appropriate output channel 26'. The router controller 20' is used to control the operation of the router 10'. Those skilled in the art will recognize that the router controller 20' is often implemented by a sequencer based router controller.

Input data is received in bursts by the input frame buffer 14' associated with the appropriate input channel 16'. To deshuffle the bursts of input data, the bursts are stored in the input frame buffer 14' in memory locations corresponding to the deshuffled positions thereof as controlled by the controller 20'. Once the input data bursts are stored in their deshuffled order, the data is routed to the output formatter and time shuffler 21' through the data bus 18'.

The output format frame buffer 22', for the appropriate output channel 26', receives the deshuffled burst data from the data bus 18'. The output format frame buffer 22' outputs the data at the proper rate and with the proper burst size to the burst shuffling frame buffer 24' as controlled by the controller 20'. The burst shuffling frame buffer 24' stores the data bursts received from the output format frame buffer 22' in a shuffled order. Thus, the burst data can then be sent to the output channel 26 for transmission in a shuffled order and with the proper format.

Figure 2:
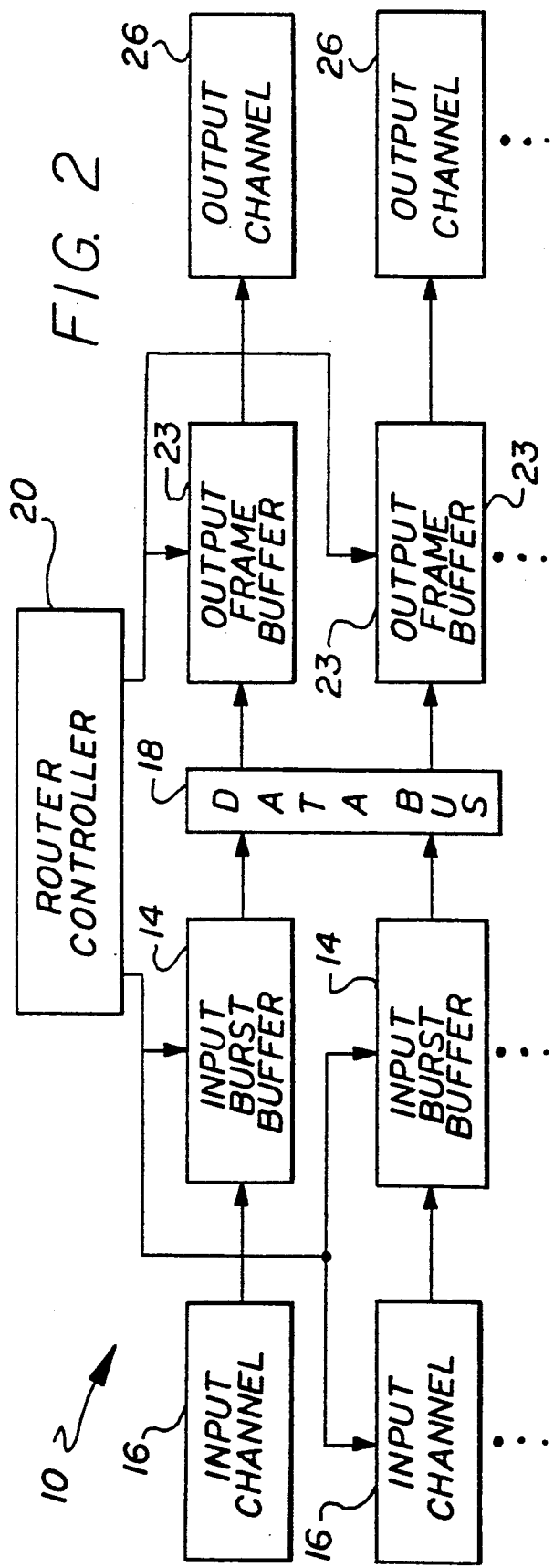
FIG. 2 shows a block diagram of an illustrative embodiment of the improved data router with burst shuffling and deshuffling output buffers constructed in accordance with the teachings of the present invention.

The advantageous teachings of the present invention may now be described with reference to FIG. 2. FIG. 2 shows a block diagram of an illustrative embodiment of an improved data router 10 with burst shuffling and deshuffling output buffers constructed in accordance with the teachings of the present invention. The router 10 includes one input burst buffer 14 per input channel 16, a data bus 18, a router controller 20 and one output frame buffer 23 per output channel 26. The router 10 operates by first storing each input data burst received from the appropriate input channel 16 in the associated input burst buffer 14 and then transferring the data through the data bus 18 to the appropriate output frame buffer 23. Each data burst is stored in the output frame buffer 23 in a time deshuffled order. Once storage is complete, the data is transmitted in formatted and time shuffled order on the appropriate output channel 26.

Unlike the router 10' of the related art, the router 10 of the present invention requires only an input burst buffer 14 rather than an input frame buffer 14'. The input burst buffer 14 need only be capable of storing a burst of data because the output frame buffer 23 controls the deshuffling of the input burst data. In addition, the router 10 requires only one output frame buffer 23 per output channel 26 rather than the output format frame buffer 22' and burst shuffling frame buffer 24' required for each output channel 26' of the router 10' of the related art. Only one output frame buffer 23 is required because the router 10 uses the output frame buffer 23 for both formatting and time shuffling of the burst data in addition to input burst deshuffling as mentioned above. Thus, the router 10 of the present invention requires fewer frame buffers than is required by the router 10' of the related art. Those skilled in the art will appreciate that the system of the present invention provides a data router with reduced memory requirements.

During configuration of the router 10, the user programs the router controller 20 including indicating the input channel 16 for each burst of data, the storage locations in the appropriate output frame buffer 23 for this data and the data input and output rates. The router controller 20 may be implemented by a sequencer based routing controller or other type of circuit without departing from the scope of the present invention. During the operation of the router 10, the controller 20 provides the appropriate timing signals such that the input bursts are received properly from the input channels 16, stored in the output frame buffers' 23 memory locations reserved during configuration and transmitted properly on the output channels 26. Those skilled in the art will recognize that a customer "black box" may be used to provide the controller 20 with information for controlling the deshuffling and shuffling of data as required for a specific application.

Figure 3:
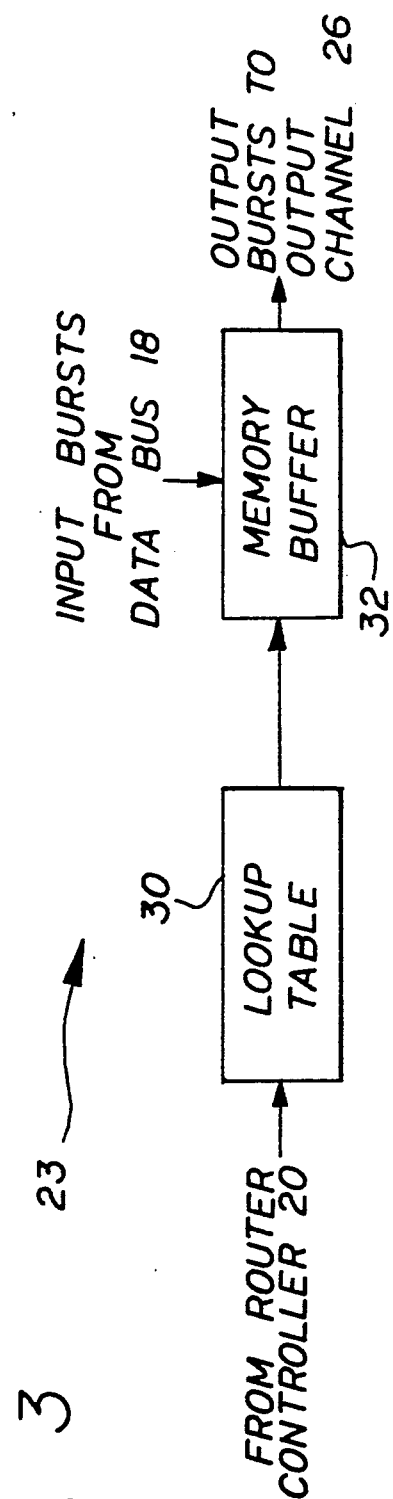
FIG. 3 shows a simplified block diagram of the output buffer of the improved data router of the present invention.

FIG. 3 shows a simplified block diagram of an illustrative implementation of the output frame buffer 23 of the router 10 of the present invention. The output frame buffer 23 contains a lookup table 30 and a memory buffer 32. The lookup table 30 and the memory buffer 32 may be implemented by a random access memory (RAM) or other storage device without departing from the scope of the present invention. Input bursts are received by the memory buffer 32 from the data bus 18 and are stored in a deshuffled order in the memory buffer 32 according to the starting addresses received from the lookup table 30. For outputting the burst data, the lookup table 30 provides starting addresses corresponding to a shuffled order for the output bursts. The router controller 20 controls the loading of the lookup table 30 with the appropriate starting addresses and provides address inputs to the lookup table 30 and the proper timing signals for inputting and outputting the data bursts with the proper format. Those skilled in the art will appreciate that a read only memory (ROM) may be utilized for the lookup table 30 without departing from the scope of the present invention.

Figure 4:
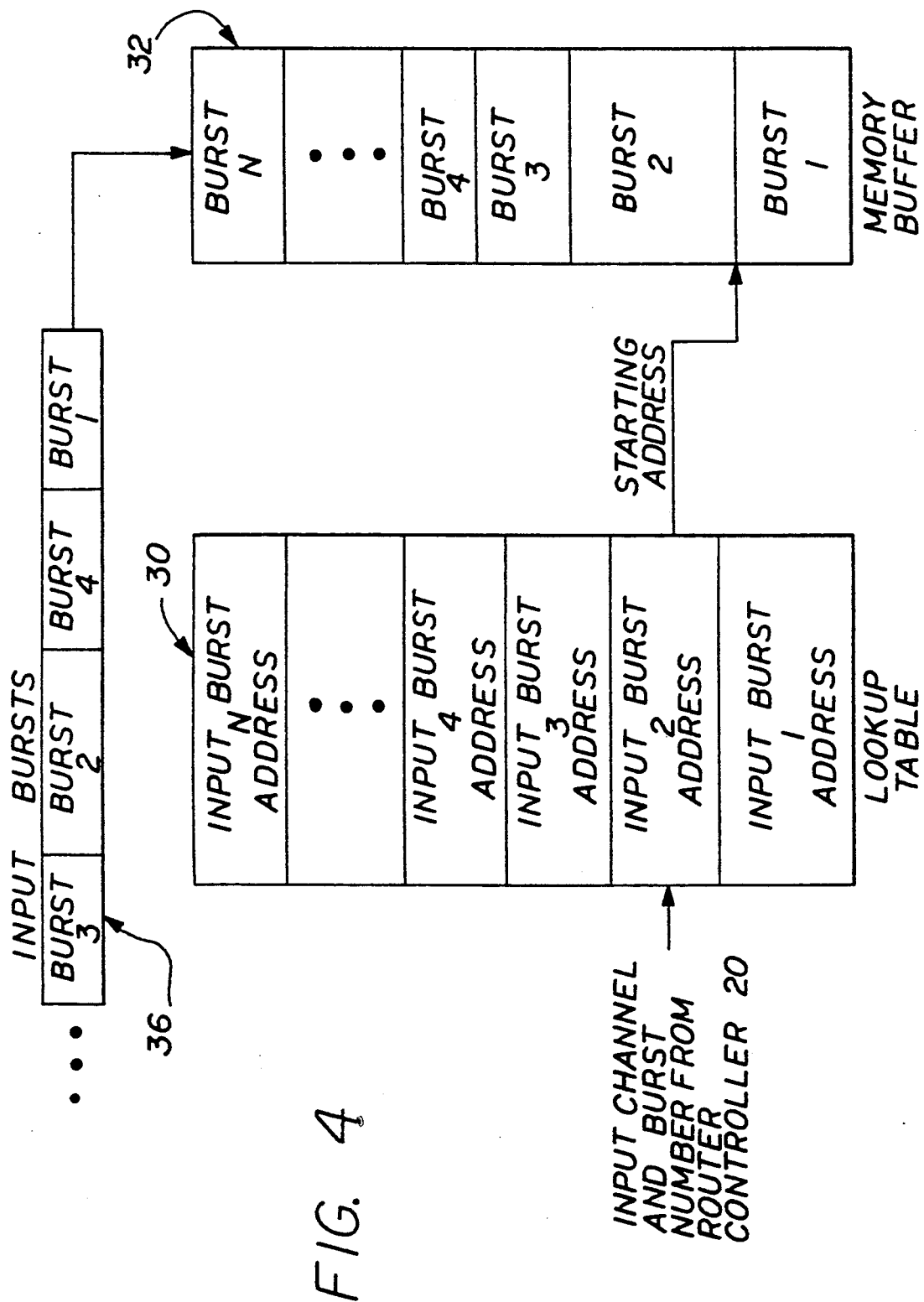
FIG. 4 illustrates the operation of the output buffer of the improved data router of the present invention for input burst deshuffling and formatting.

FIG. 4 illustrates the operation of the output frame buffer 23 of the router 10 of the present invention for input burst deshuffling and formatting. During configuration, the router controller 20 loads the lookup table 30 with the starting addresses required for storage of each input burst in a deshuffled order in the memory buffer 32. The starting addresses account for the size of the input burst, the input channel 16 that the burst is received from and the input burst number. When the input bursts are then sent to the memory buffer 32, the router controller 20 provides the corresponding input channel 16 number and input burst number as an address input to the lookup table 30, and, in turn, the lookup table 30 provides the starting address to the memory buffer 32. Thus, the appropriate starting addresses are provided to the memory buffer 32 to store the input bursts in a deshuffled order in the memory buffer 32. Those skilled in the art will appreciate that the memory buffer 32 or router controller 20 may be used to provide subsequent addresses for storage of each bit of input data. Those skilled in the art will also appreciate that the input bursts may be from a combination of one or more input channels 16 and that each input data burst may have a different data rate without departing from the scope of the present invention. Furthermore, a customer "black box" or other device may be utilized to provide the router controller 20 with the input channel 16 number and burst number for the input bursts without departing from the scope of the present invention. In addition, other information may be provided to the router controller 20 for format control including the size of each input burst and the data rates for the input bursts without departing from the scope of the present invention.

Figure 5:
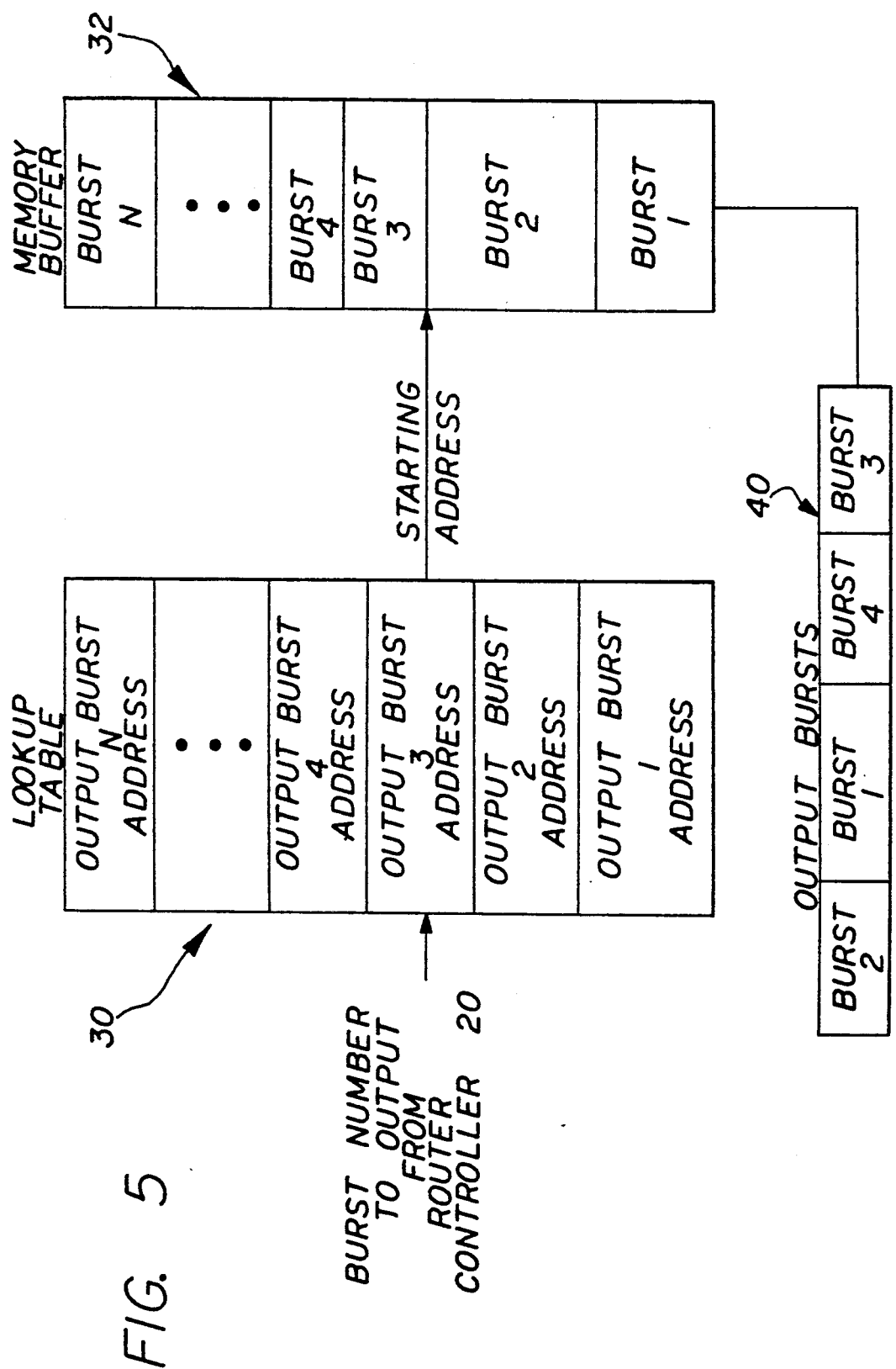
FIG. 5 illustrates the operation of the output buffer of the improved data router of the present invention for output burst shuffling and formatting.

FIG. 5 illustrates the operation of the output frame buffer 23 of the router 10 of the present invention for output burst shuffling and formatting. During router configuration, the router controller 20 loads the lookup table 30 with the starting addresses for each of the output bursts. During operation the router controller 20 provides output burst numbers to the lookup table 30 which in turn provides the starting addresses of the output bursts to the buffer memory 32. Those skilled in the art will appreciate that a customer "black box" or other circuitry may be utilized by the router controller 20 to provide output burst numbers to the lookup table 30 for shuffling the output bursts. Different output burst 40 data rates and output burst sizes may be used to provide output burst formatting to meet the requirements of the system receiving the satellite data as controlled by the router controller 20. Those skilled in the art will also appreciate that output burst formatting information may be stored in the lookup table 30 including data rate information without departing from the scope of the present invention.

The input burst boundaries may be different than output burst boundaries, thus, several input bursts may be combined into one output burst 40 or an input burst may be split into more than one output burst. Furthermore, by entering the same starting address for one or more output bursts, output bursts may be repeated without incurring any router 10 overhead. In addition, in an alternate embodiment, a data bus may be added between the output frame buffers 23 and output channels 26 such that output bursts may be routed from any output frame buffer 23 to any output channel 26 as appropriate for a particular application.

Thus, the present invention has been described herein with reference to a particular embodiment for a particular application. Those having ordinary skill in the art and access to the present teachings will recognize additional modifications applications and embodiments within the scope thereof. For example, those skilled in the art and with access to the teachings of the present invention may design data routers 10 with the number of input channels 16 and output channels 26 required for a particular application. In addition, the design of the router controller 20 may allow for deshuffling, formatting and shuffling of the burst data of proper burst sizes and at data rates as appropriate for a particular application without departing from the scope of the present invention. Clearly, the improved data router with burst shuffling and deshuffling output buffers of the present invention is not for use solely in satellite systems, but may be utilized in other types of communication systems.

It is therefore intended by the appended claims to cover any and all such applications, modifications and embodiments within the scope of the present invention.

Accordingly,

What is claimed is:

1. An improved data router comprising:

input means for providing input data in a burst shuffled format and means for storing data from said input means in an output buffer in burst deshuffled order and for outputting data from said output buffer in a burst shuffled format, including:

lookup table means for storing and outputting a plurality of addresses;

output buffer means, consisting essentially of a single buffer for each output channel, for storing and outputting data at said addresses provided by said lookup table means; and controller means for providing inputs to said lookup table means to cause said lookup table means to output addresses to said output buffer effective to cause said output buffer means to store said input data in a burst deshuffled format and to output said stored data in a burst shuffled format.

2. An improved data routing method including the steps of:

a) receiving input data in a burst shuffled format and b) storing said received data in an output buffer in burst deshuffled order including the steps of:

b1) storing and outputting a plurality of addresses in a lookup table and b2) storing and outputting data in an output buffer at said addresses provided by said lookup table; and c) providing inputs to said lookup table to cause said lookup table to output addresses to said output buffer effective to cause said output buffer to store said stored data in a burst deshuffled format and output said stored data in a burst shuffled format.

* * * * *